United States Patent
Olberding et al.

(10) Patent No.: US 9,068,658 B2
(45) Date of Patent: Jun. 30, 2015

(54) APPARATUS TO BIAS VALVE CLOSURE MEMBERS

(75) Inventors: Jason Gene Olberding, Marshalltown, IA (US); Bryan Quinn Leger, Marshalltown, IA (US); Paul Russell Dalluge, Marshalltown, IA (US)

(73) Assignee: FISHER CONTROLS INTERNATIONAL LLC, St. Louis, MO (US)

( * ) Notice: Subject to any disclaimer, the term of this patent is extended or adjusted under 35 U.S.C. 154(b) by 777 days.

(21) Appl. No.: 13/285,588

(22) Filed: Oct. 31, 2011

(65) Prior Publication Data

US 2012/0043489 A1 Feb. 23, 2012

Related U.S. Application Data

(63) Continuation of application No. 12/017,716, filed on Jan. 22, 2008, now Pat. No. 8,070,130.

(51) Int. Cl.
*F16K 1/22* (2006.01)
*F16K 1/16* (2006.01)
*F16K 5/00* (2006.01)

(52) U.S. Cl.
CPC ... *F16K 1/16* (2013.01); *F16K 5/00* (2013.01); *F16K 1/224* (2013.01)

(58) Field of Classification Search
CPC ............. F16K 1/16; F16K 1/224; F16K 5/00; F16K 1/22; F16K 1/18
USPC ............ 251/308, 88, 313, 305, 337; 123/337
See application file for complete search history.

(56) References Cited

U.S. PATENT DOCUMENTS

| | | | |
|---|---|---|---|
| 1,958,262 | A | 5/1934 | Boland |
| 2,879,027 | A | 3/1959 | Mueller |
| 3,815,870 | A | 6/1974 | Milleville et al. |
| 3,968,970 | A | 7/1976 | Vogeli |
| 4,120,596 | A | 10/1978 | Kunkle |
| 4,273,308 | A | 6/1981 | Nakai |

(Continued)

FOREIGN PATENT DOCUMENTS

| | | |
|---|---|---|
| GB | 341688 | 1/1931 |
| GB | 1369885 | 10/1974 |

OTHER PUBLICATIONS

European Patent Office, "Office Communication," issued in connection with European application serial No. 08 871 536.2, issued Feb. 21, 2011, 4 pages.

(Continued)

*Primary Examiner* — Marina Tietjen
(74) *Attorney, Agent, or Firm* — Hanley, Flight & Zimmerman, LLC (57) ABSTRACT

Apparatus to bias valve closure members are described. An example valve includes a valve body having an opening defining a passageway. The opening has an axis that is substantially coaxially aligned with a flow path axis defined by the passageway. A first shaft supports a closure member within the passageway of the valve body and relative to the opening and an end cap removably coupled to the valve body retains the shaft within a bore of the valve body. A spring is disposed between the first seating surface and a second seating surface opposite the first seating surface to provide a force to oppose the weight of the closure member and facilitate alignment of the closure member relative to the opening of the passageway.

16 Claims, 7 Drawing Sheets

(56) References Cited

U.S. PATENT DOCUMENTS

| | | |
|---|---|---|
| 4,510,966 A | 4/1985 | Parsons, Jr. |
| 4,846,441 A | 7/1989 | Scobie et al. |
| 4,877,339 A * | 10/1989 | Schuster et al. ............ 384/218 |
| 5,129,625 A | 7/1992 | Wood et al. |
| 5,190,264 A | 3/1993 | Boger |
| 5,234,194 A | 8/1993 | Smith |
| 5,326,074 A | 7/1994 | Spock, Jr. et al. |
| 5,593,166 A | 1/1997 | Lovell et al. |
| 5,601,276 A | 2/1997 | Wordin |
| 6,651,957 B2 | 11/2003 | Wordin et al. |
| 6,974,121 B2 | 12/2005 | Koester et al. |
| 7,093,618 B2 | 8/2006 | Williams et al. |
| 7,243,901 B2 | 7/2007 | Eggleston |
| 7,387,291 B2 | 6/2008 | Jira et al. |
| 8,070,130 B2 | 12/2011 | Olberding et al. |
| 2003/0062688 A1 | 4/2003 | Dorrian et al. |
| 2006/0255307 A1* | 11/2006 | Jira et al. ................ 251/337 |
| 2009/0184276 A1 | 7/2009 | Olberding et al. |

OTHER PUBLICATIONS

International Searching Authority, "International Search Report," issued in connection with international application serial No. PCT/US2008/087015, mailed Apr. 29, 2009, 4 pages.

International Searching Authority, "Written Opinion of the International Searching Authority," issued in connection with international application serial No. PCT/US2008/087015, mailed Apr. 29, 2009, 5 pages.

United States Patent and Trademark Office, "Notice of Allowance," issued in connection with U.S. Appl. No. 12/017,716, mailed Jul. 29, 2011, 16 pages.

United States Patent and Trademark Office, "Non-Final Office Action," issued in connection with U.S. Appl. No. 12/017,716, mailed Mar. 14, 2011, 25 pages.

* cited by examiner

APPARATUS TO BIAS VALVE CLOSURE MEMBERS

CROSS REFERENCE TO RELATED APPLICATION

This patent arises from a continuation of U.S. patent application Ser. No. 12/017,716, filed Jan. 22, 2008, entitled "Apparatus to Bias Valve Closure Members," which is incorporated herein by reference in its entirety.

FIELD OF THE DISCLOSURE

This disclosure relates generally to valves and, more particularly, to apparatus to bias valve closure members.

BACKGROUND

Valves are commonly used in process control systems to control the flow of process fluids. Rotary valves (e.g., butterfly valves) typically have a closure member (e.g., a disk) disposed in a fluid path. A shaft operatively couples the closure member to an actuator that rotates the closure member between an open position and a closed position to allow or restrict the flow of fluid between an inlet and an outlet of the valve. When the closure member is rotated to the closed position, the closure member sealingly engages a valve seat or sealing surface (e.g., a seal ring fixed to the valve body) to restrict the flow of fluid through the valve.

A peripheral edge of the closure member is used as a seal contact surface for the valve and must be properly aligned with the sealing surface to effect a proper seal. Thus, to effect a proper seal, it is critical that the closure member be precisely positioned within the valve body so that the peripheral edge of the closure member can sealingly mate or engage the sealing surface. Due to the requirement for precise alignment of the valve closure member relative to the valve sealing surface, rotary valves often cannot be installed in a vertical orientation. In particular, the weight of the valve components or valve trim (e.g., a drivetrain) can cause the closure member to shift and become misaligned with the valve body and sealing surface, thereby comprising the integrity of the seal and causing undesired leakage through the valve (i.e., a quantity of fluid passing through the valve when the valve is in the closed position).

SUMMARY

A valve closure member biasing apparatus described herein includes a first spring seat having a first seating surface and a first protruding member extending a predetermined distance from the first seating surface and a second spring seat having a second seating surface and a second protruding member extending a predetermined distance from the second seating surface. The first and second protruding members engage to slidably couple the first and the second spring seats.

In another example, a valve described herein includes a valve body, a shaft having a bore and a closure member operatively coupled to the shaft. The example valve further includes a biasing member disposed at least partially within the bore of the shaft to align the closure member with the valve body.

In yet another example, a valve described herein includes means for biasing a shaft to align a valve closure member relative to a valve sealing surface and means for rotatably fixing the means for biasing relative to the shaft.

DETAILED DESCRIPTION

Generally, the example biasing apparatus described herein may be used to maintain proper alignment (e.g., centering) of a rotary valve closure member relative to a valve seat or sealing surface of the valve body to prevent undesired leakage through the valve. The biasing apparatus described herein are particularly advantageous when the rotary valves (e.g., control valves, throttling valves, etc.) are mounted in a vertical orientation (i.e., so that the longitudinal axis of the valve shaft is vertically oriented). More specifically, when a rotary valve is mounted in a vertical orientation, the weight of the valve components (e.g., the drive shaft, the closure member, the follower shaft, etc.) can cause the closure member to become misaligned relative to the sealing surface of the valve body. Such misalignment can result in a poor seal between the closure member and the sealing surface which, in turn, results in undesirable leakage through the valve.

The example biasing apparatus described herein provide a force to oppose the weight of the valve components to maintain alignment of the closure member relative to the valve body so that the closure member can sealingly engage the sealing surface and prevent undesired leakage. Additionally, in one example, a biasing apparatus includes a spring disposed between two spring seats that slidably engage and interlock and that can move (i.e., slide) relative to one another along an axis of the spring, but which are fixed (i.e., cannot rotate) relative to each other about the axis of the spring. In this manner, in addition to maintaining alignment of a valve closure member, the example biasing apparatus described herein can reduce or eliminate spring fatigue and/or failure by substantially preventing or reducing torsional loading on the spring caused by the closure member rotating between an open and a closed position. The example biasing apparatus described herein may be provided as a factory installed option or, alternatively, can be retrofit existing rotary valves in the field.

Figure 1A:
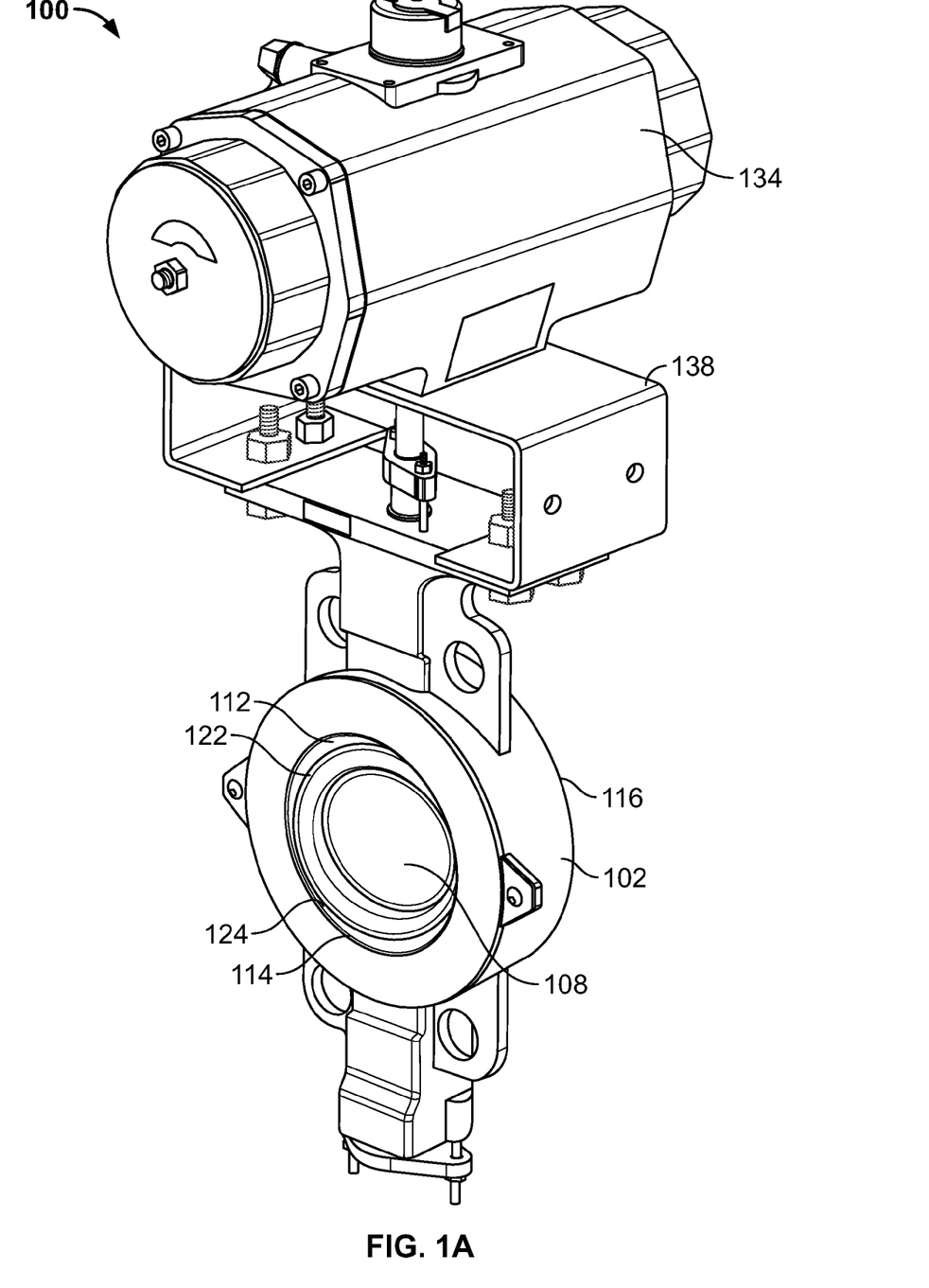
FIG. 1A is a perspective view of an example valve described herein.
Figure 1B:
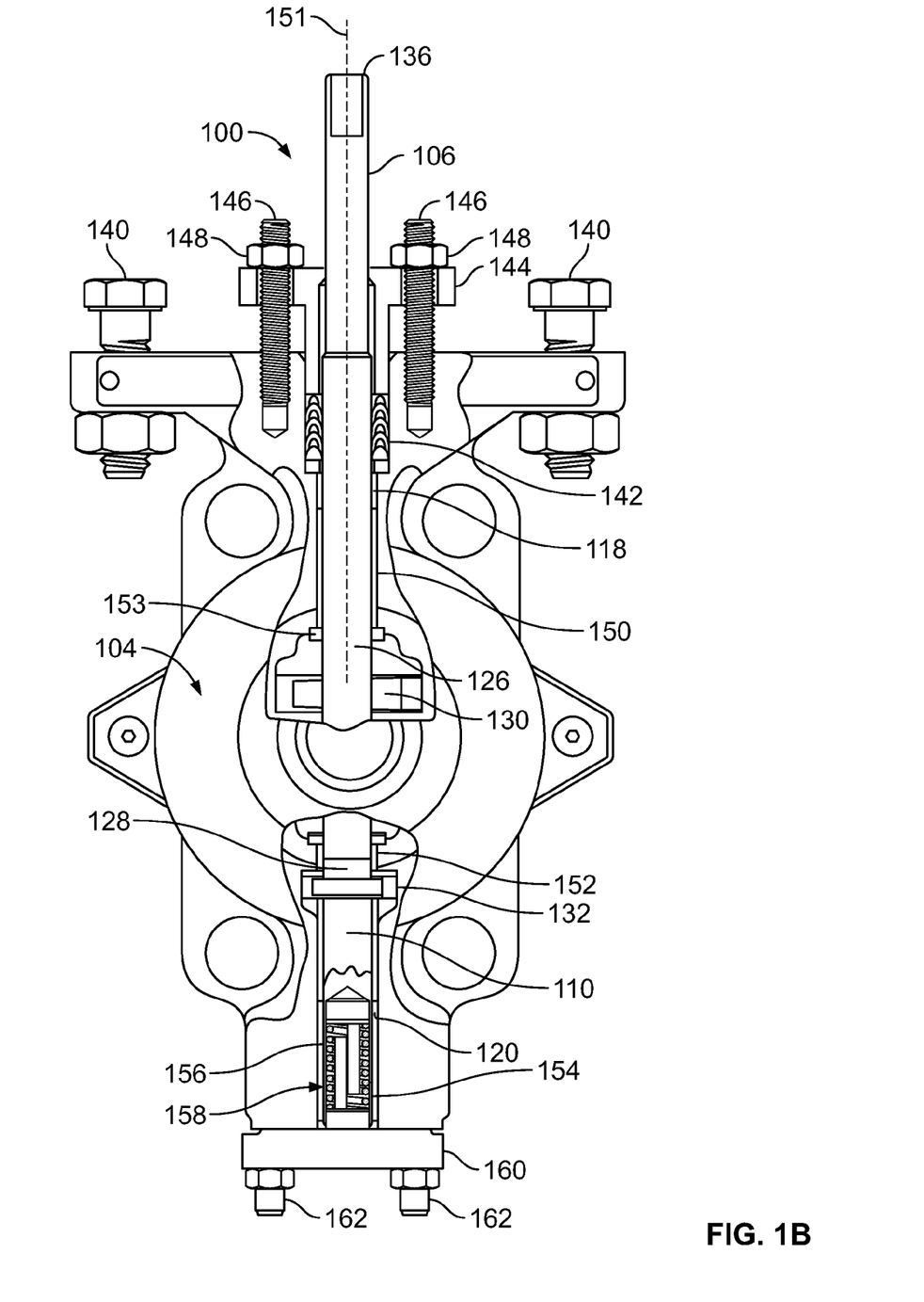
FIG. 1B is a cross-sectional view of a portion of the example valve shown in FIG. 1A.

FIG. 1A is a perspective view of an example valve 100. FIG. 1B is a cross-sectional view of a portion of the valve 100 illustrated in FIG. 1A. The example valve 100 illustrated in FIGS. 1A and 1B includes a valve body 102 that houses a valve trim or drivetrain 104. The drivetrain 104 includes a drive shaft 106, a closure member 108 (e.g., a disk), and a follower shaft 110. Of course, one of ordinary skill in the art will appreciate that the drive shaft and follower shaft may be of unitary or single piece construction without departing from the spirit and scope of the described invention. The valve body 102 is generally cylindrical and has a central opening 112 that defines a fluid flow passageway between an inlet 114 and an outlet 116. The valve body 102 also has a first or drive end opening 118 and a second or follower end opening 120 that are generally coaxially aligned and adapted to receive the drive shaft 106 and the follower shaft 110, respectively. In other example implementations, the valve 100 includes a shaft that extends through the opening 118 and at least partially through opening 120 and is operatively coupled to the closure member 108 via fasteners, pins, etc.

The closure member 108 is disposed within the fluid flow passageway and is illustrated as a disk having a peripheral edge 122 that sealingly engages a valve seat or annular sealing surface 124 (e.g., a seal ring) disposed in the central opening 112 to prevent the flow of fluid through the valve 100. The closure member 108 is operatively coupled to a first end 126 of the drive shaft 106 and to a first end 128 of the follower shaft 110 via pins 130 and 132, respectively. An actuator 134 (e.g., an electric actuator) is operatively coupled to a second end 136 of the drive shaft 106 and drives the closure member 108 between a closed position and an open position to control the flow of fluid through the valve 100. The second end 136 of the drive shaft 106 may be a splined end, a square end, etc. A mounting bracket 138 and a plurality of fasteners 140 couple the actuator 134 to the valve body 102.

The valve 100 may include a packing 142 that is disposed in the opening 118 of the valve body 102 and which engages the drive shaft 106. A packing flange 144 adjusts and retains the packing 142 within the valve body 102 and couples to the valve body 102 via packing flange studs 146 and bolts 148. Bearings 150 and 152 are disposed in the openings 118 and 120, respectively, between the drive shaft 106 and the follower shaft 110 and the valve body 102. The bearing 150 aligns the closure member 108 along an axis 151 of the drive shaft 106 and a bearing flange 153 aligns (i.e., centers) the closure member 108 relative to the central opening 112 and the valve body 102. The bearings 150 and 152 also aid the shafts 106 and 110 in alignment and rotation, and reduce friction between the shafts 106 and 110 and the valve body 102.

A second end 154 of the follower shaft 110 includes a bore or aperture 156 to receive an example biasing apparatus 158. An end cap 160 retains the biasing apparatus 158 within the bore 156 of the follower shaft 110 and is coupled to the valve body 102 via fasteners 162. In other example implementations, a packing can also be disposed in the opening 120 and a packing flange can be coupled to the valve body 102 to retain the packing and the biasing apparatus 158 within the bore 156 of the follower shaft 110. The follower shaft 110 can be made as a substantially unitary piece via machining and/or any other suitable processes. Additionally or alternatively, a follower shaft can be retrofit to include an elongated bore (e.g., the bore 156) via for example, machining, etc., to receive the biasing apparatus 158 described herein.

In operation, the actuator 134 drives the closure member 108 between an open position to allow the flow of fluid through the valve 100 and a closed position to restrict the flow of fluid through the valve 100. The closure member 108 engages the sealing surface 124 (e.g., a seal ring) to effect a seal and provide a shutoff (i.e., prevent the flow of fluid through the valve 100). The biasing apparatus 158 provides a force (e.g., an axial force along the longitudinal axis 151) to oppose the weight of the drivetrain 104 and biases the control member 108 against or toward the bearing 150 and axially along the longitudinal axis 151 when the example valve 100 is mounted in a vertical or substantially vertical orientation (e.g., as depicted in FIG. 1A). The biasing apparatus 158 provides an axial force along the longitudinal axis 151 to bias and/or maintain the alignment or position of the closure member 108 relative to the sealing surface 124 so that the closure member 108 is substantially centered and/or precisely positioned within the valve body 102. As a result, the peripheral edge 122 of the disk 108 can sealingly mate or engage the sealing surface 124 to prevent undesired leakage through the valve 100. Thus, the biasing apparatus 158 prevents the closure member 108 from shifting axially along the longitudinal axis 151 and becoming misaligned relative to the sealing surface 124.

In the illustrated example, the closure member 108 is depicted as a disk. However, in other example implementations, the closure member 108 can be any suitable closure member 108 such as, for example, a segmented ball, etc. Additionally or alternatively, the example described in connection with the biasing apparatus 158 described herein is not limited to the example valve 100 illustrated in FIGS. 1A and 1B and may be used with other types of rotary valves such as, for example, a ball valve, a segmented ball valve, etc.

Additionally, as stated above, the example biasing apparatus described herein can be retrofit to existing rotary valves in the field. For example, to retrofit a valve, a pin (e.g., the pin 132) and an end cap (e.g., the end cap 160) of a valve are removed and a follower shaft of the valve is detached from a closure member (e.g., the closure member 108) and removed from a valve body (e.g., the valve body 102). A follower shaft (e.g., the follower shaft 110) having a bore (e.g., the bore 156) and a biasing apparatus (e.g., the biasing apparatus 158) replace or are substitute for the follower shaft of the valve already in the field. The replacement follower shaft is coupled or reattached to the closure member and the end cap is reattached to the valve body.

In other example implementations, a follower shaft of a valve already in the field is detached from a closure member (e.g., the closure member 108) and removed from a valve body (e.g., the valve body 102). The shaft is modified to include a bore (e.g., via machining, etc.) that is sized to receive a biasing apparatus (e.g., the biasing apparatus 158). The modified shaft is then coupled or reattached to the closure member and the biasing apparatus is disposed at least partially within the bore of the shaft. The end cap is reattached to the valve body and retains the biasing apparatus within the bore.

Figure 2A:
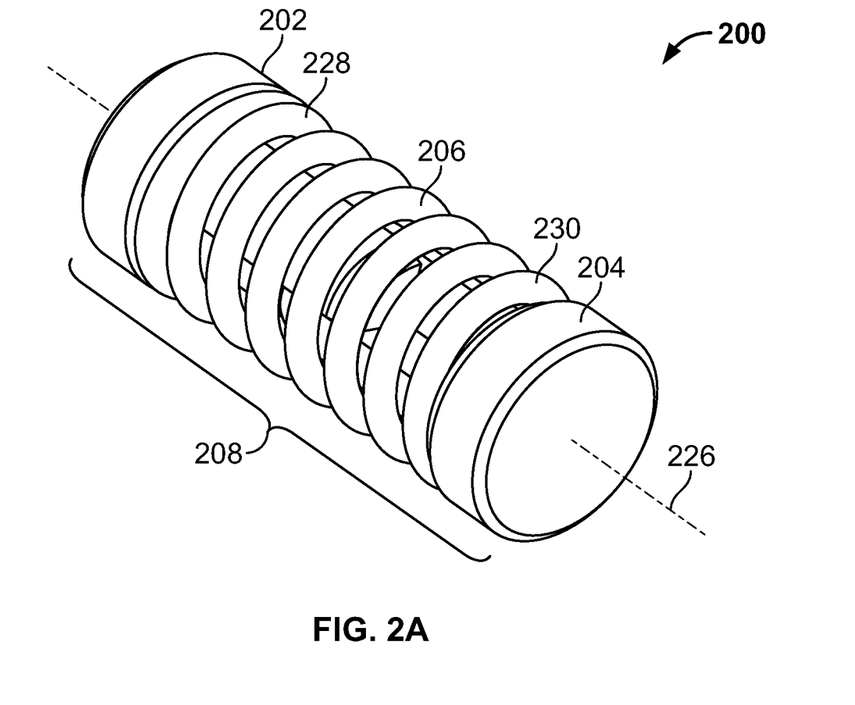
FIGS. 2A-2B are perspective views of an example biasing apparatus described herein that can be implemented with the example valve of FIGS. 1A and 1B.
Figure 2B:
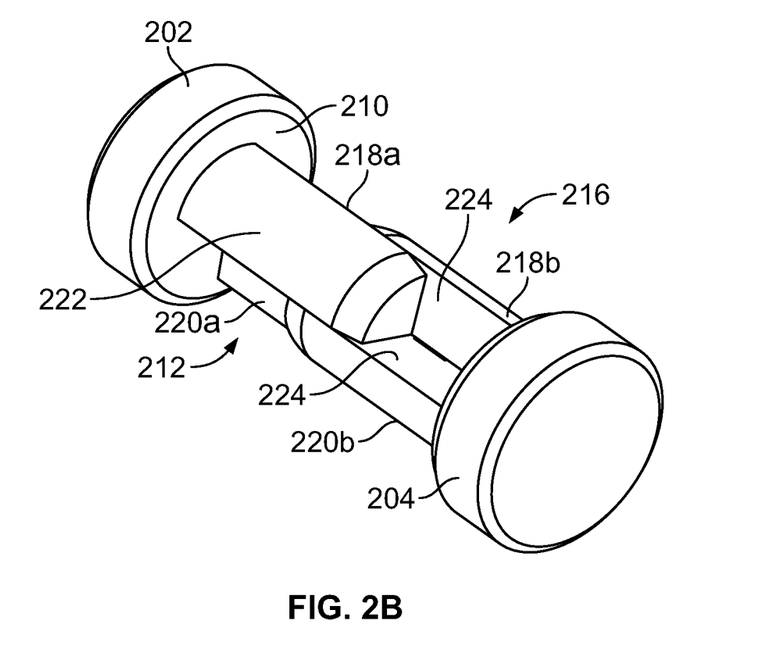
Figure 2C:
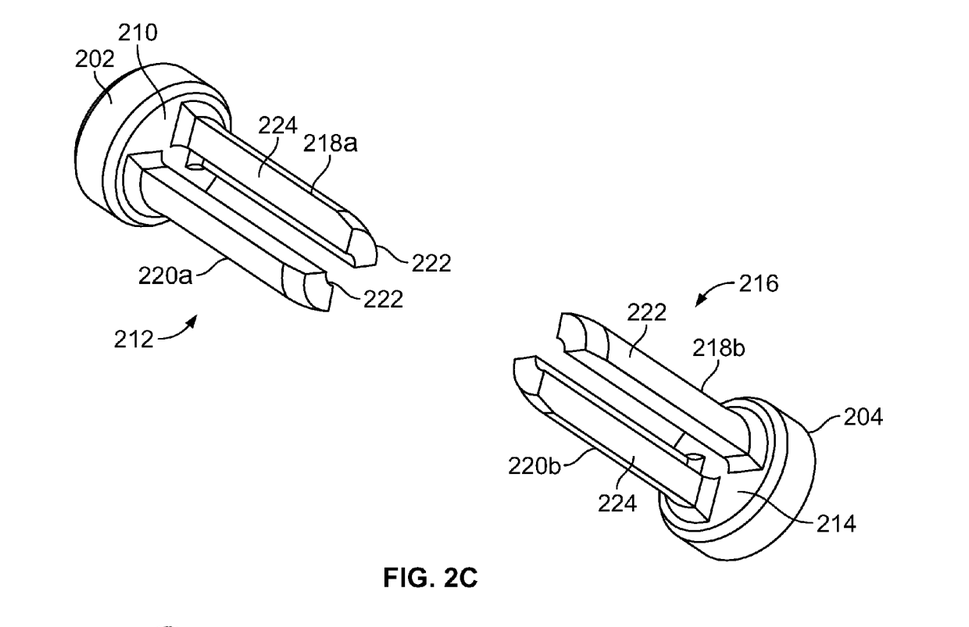
FIG. 2C is an exploded view of the biasing apparatus shown in FIGS. 2A and 2B.
Figure 2D:
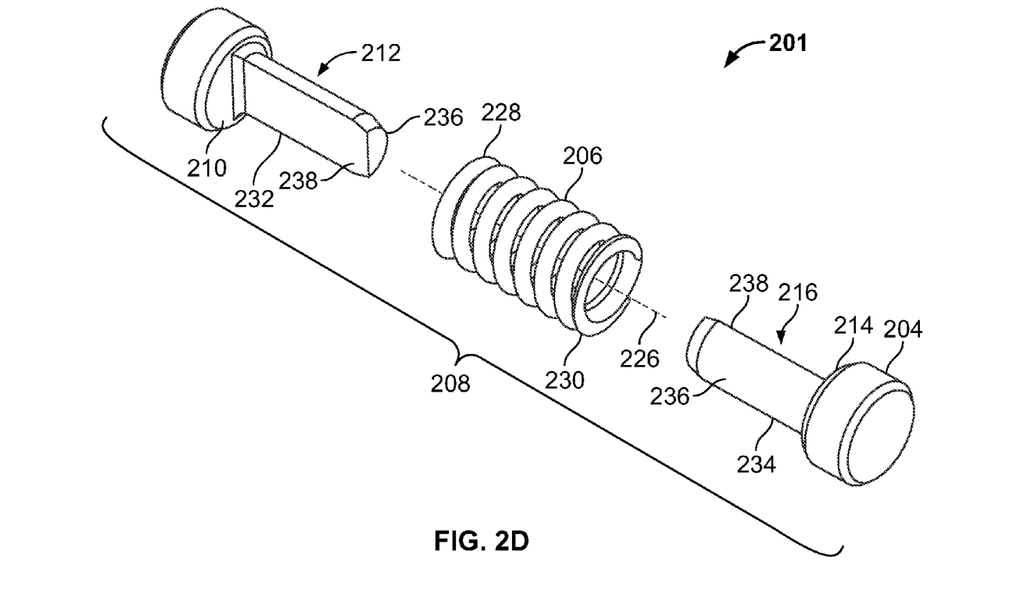
FIG. 2D is an exploded view of an alternative example biasing apparatus described herein.

FIGS. 2A and 2B are perspective views of an example biasing apparatus 200 that can be implemented with the example valve 100 of FIGS. 1A and 1B. FIG. 2C illustrates an exploded view of the example biasing apparatus 200 of FIGS. 2A and 2B. FIG. 2D illustrates an alternative example biasing apparatus 201 described herein.

Referring to FIGS. 2A-2D, the example biasing apparatus 200 and 201 each include a first portion or spring seat 202, a second portion or spring seat 204, and a spring 206 (e.g., a coil spring, a helical spring, etc.) disposed therebetween. The first spring seat 202 and the second spring seat 204 form a body 208 that is sized so that at least a portion of the body 208 can be received by a bore (e.g., the bore 156 of FIG. 1B) of a shaft (e.g., the follower shaft 110 of FIG. 1B). The first spring seat 202 includes a first seating surface 210 and a first protruding member 212 and the second spring seat 204 includes a second seating surface 214 and a second protruding member 216.

In the illustrated example of FIGS. 2A-2C, the first protruding member 212 slidably couples to the second protruding member 216 so that the first spring seat 202 can slide relative to the second spring seat 204. The first and second protruding members 212 and 216 include respective first prongs or legs 218a-b adjacent to second prongs or legs 220a-b that extend a predetermined distance from their respective seating surfaces 210 and 214. To slidably couple the first and second spring seats 202 and 204, the first and second prongs 218a and 220a of the first spring seat 202 slidably coupled or interlocked with the first and second prongs 218b and 220b of the second spring seat 204. The prongs 218a-b and 220a-b may have curved surfaces 222 and substantially flat surfaces 224, which form complementary wedge-shaped interlocking portions. When the first and the second protruding members 212 and 216 are coupled or interlocked together, the flat surfaces 224 of the prongs 218a and 220a of the first spring seat 202 slidably engage the flat surfaces 224 of the prongs 218b and 220b of the second spring seat 204. When engaged or coupled, the protruding members 212 and 216 have a transverse cross-sectional shape or area that is generally circular. In other example implementations, the protruding members 212 and 216, when coupled together, can have a polygonal-shaped (e.g., square, rectangular, etc.) transverse cross-sectional shape or area.

In the illustrated example, the first spring seat 202 can move relative to the second spring seat 204 along an axis 226 of the spring 206. However, the first spring seat 202 is rotatably fixed about the axis 226 relative to second spring seat 204. As a result, the spring 206 can be compressed and extended along its longitudinal axis 226, but a first end 228 of the spring 206 cannot rotate or twist relative to a second end 230 of the spring 206 about the axis 226. Thus, the example biasing apparatus 200 prevents the upper end 228 of the spring 206 from twisting or rotating relative to the lower end 230 of the spring 206 as a result of a closure member (e.g., the closure member 108 of FIGS. 1A and 1B) rotating between an open and a closed position. In this manner, the example biasing apparatus 200 can substantially prevent or reduce torsional loading on the spring 206, thereby reducing or eliminating spring fatigue and/or failure.

Referring to FIG. 2D, the first protruding member 212 slidably engages the second protruding member 216 so that the first spring seat 202 can slide relative to the second spring seat 204. The first and second protruding members 212 and 216 include respective prongs or legs 232 and 234 that have a semi-circular cross section or shape that extend a predetermined distance from their respective seating surfaces 210 and 214. The prongs 232 and 234 may have substantially curved surfaces 236 and substantially flat surfaces 238, in which the flat surfaces 238 slidably engage so that the first protruding member 212 can slide relative to the second protruding member 216 along the axis 226 of the spring 206.

Additionally, the first spring seat 202 is rotatably fixed relative to the second spring seat 204 so that the first spring end 228 cannot rotate or twist relative to the second spring end 230, which can otherwise twist or rotate relative to each other and cause torsional loading on the spring 206 as a result of a closure member (e.g., the closure member 108 of FIGS. 1A and 1B) rotating between an open and a closed position. Similar to the biasing apparatus 200, the biasing apparatus 201 can reduce or eliminate spring fatigue and/or failure by substantially preventing or reducing torsional loading on the spring 206.

In yet other example implementations, the first protruding member 212 may be a shaft extending a predetermined distance from the first seating surface 210 and the second protruding member 216 may be a sleeve extending from the second seating surface 214 to slidably receive the shaft. The shaft may include a pin or may be keyed to engage a slot or key of the sleeve to prevent the first spring seat 202 from rotating or twisting relative to the second spring seat 204 about the axis 226 of the spring 206.

In yet another example implementation, the first protruding member 212 can be a first hollow cylinder having an inner diameter and the second protruding member 216 can be a second hollow cylinder having an outer diameter that is smaller than the inner diameter of the first cylinder such that the first cylinder slidably receives the second cylinder. The spring 206 can be at least partially disposed and/or partially encased within the first and second cylinders and the first and second cylinder portions may include a slot or groove and a pin to prevent the spring seats 202 and 204 from rotating relative to each other about the axis 226 of the spring 206, thereby substantially preventing or eliminating torsional loading on the spring 206.

The example biasing apparatus 200 and 201 may be made of plastic, metal, or any other suitable materials and can be integrally formed via injection molding, casting, and/or can be formed via any other suitable process(es) such as, for example, machining, etc. Additionally or alternatively, as illustrated in FIGS. 2A-2D, because the first spring seat 202 is substantially similar to the second spring seat 204, the example biasing apparatus 200 or 201 facilitate assembly, reduce manufacturing costs, and/or reduce inventory costs.

Additionally, the example biasing apparatus 201 is particularly advantageous to machine valve seats 202 and 204 that may require custom sizes, short lead times, and/or special material(s) that cannot be molded or cast. Additionally, the biasing apparatus 201 improves moldability and casting of the valve seats 202 and 204 and is particularly advantageous for manufacturing smaller sized valve seats 202 and 204 for use in smaller valves.

FIGS. 3-9 illustrate cross-sectional views of portions of example valves 300, 400, 500, 600, 700, 801 and 901 similar to that shown in FIGS. 1A and 1B, but implemented with alternative example biasing apparatus 302, 402, 502, 602, 702, 800 and 900 described herein. The description of those components of the example valves 300, 400, 500, 600, 700, 801 and 901 of FIGS. 3-9 that are similar or identical to those of FIGS. 1A and 1B are not repeated and the interested reader may refer to the description of FIGS. 1A and 1B for details relating to those components. The biasing apparatus 302, 402, 502, 602, 702, 800 and 900 enable the example valves 300, 400, 500, 600 700, 801 and 901 to be installed in a vertical or substantially vertical orientation and oppose the weight of the components (e.g., the drivetrain 104 of FIGS. 1A and 1B) of a valve to maintain alignment and/or position of a closure member (e.g., the closure member 108 of FIGS. 1A and 1B) with a sealing surface (e.g., the sealing surface 124 of FIGS. 1A and 1B) of a valve body (e.g., the valve body 102 of FIGS. 1A and 1B), thereby preventing undesired leakage when the closure member is in a closed position.

Figure 3:
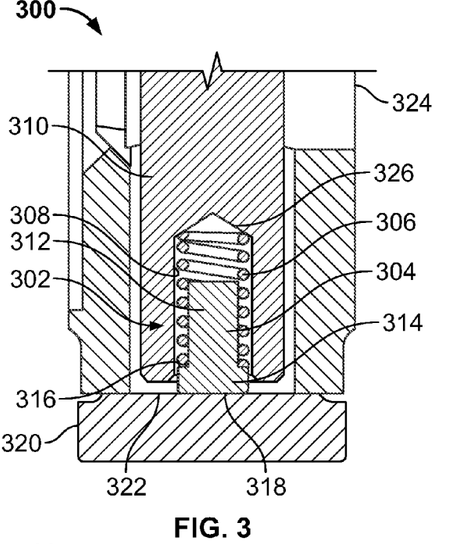
FIGS. 3-9 illustrate alternative example biasing apparatus described herein.

Referring to FIG. 3, the example valve 300 includes the example biasing apparatus 302. The biasing apparatus 302 includes a spring seat 304 and a spring 306 (e.g., a coil spring). The biasing apparatus 302 has at least a portion thereof disposed within a bore 308 of a shaft 310 (e.g., a follower shaft). The spring seat 304 includes a leg or protruding member 312 (e.g., cylindrical or polygonal leg or post, etc.) and a seating surface 314 having a first side 316 to engage the spring 306 and a second side 318 to engage an end cap 320. The valve 300 may include a gasket 322 to provide a seal between the end cap 320 and a valve body 324. The length or height of the leg or protruding member 312 can vary and can be any desired length or height (e.g., a short length). In yet other example implementations, the spring seat 304 can be disposed within the bore 308 of the shaft 310 so that the second side 318 of the seating surface 314 engages a surface 326 of the bore 308 and the spring 306 is captured between the first side 316 of the seating surface 314 and the end cap 320 and/or the gasket 322.

Figure 4:
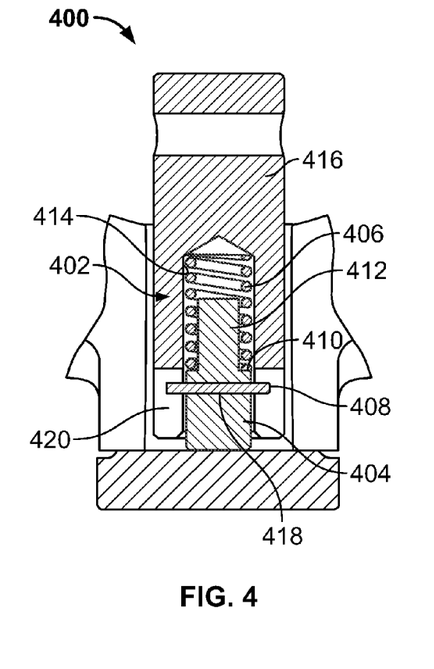

In FIG. 4, the example valve 400 includes the biasing apparatus 402. The biasing apparatus 402 includes a spring seat 404, a spring 406 (e.g., a coil spring), and a pin 408. The spring seat 404 includes a seating surface 410 and a protruding member 412 (e.g., a leg or post) that engage the spring 406. The spring seat 404 and the spring 406 are at least partially disposed within a bore 414 of a follower shaft 416. The spring seat 404 includes an aperture or opening 418 to receive the pin 408, which engages a slot or groove 420 in the follower shaft 416, to couple the spring seat 404 to the follower shaft 416 so that the spring seat 404 cannot rotate or twist relative to the follower shaft 416. The example biasing apparatus 402 can reduce spring fatigue and/or failure by substantially reducing or eliminate torsional loading on the spring 406 caused by the rotational movement of a valve closure member.

Figure 5:
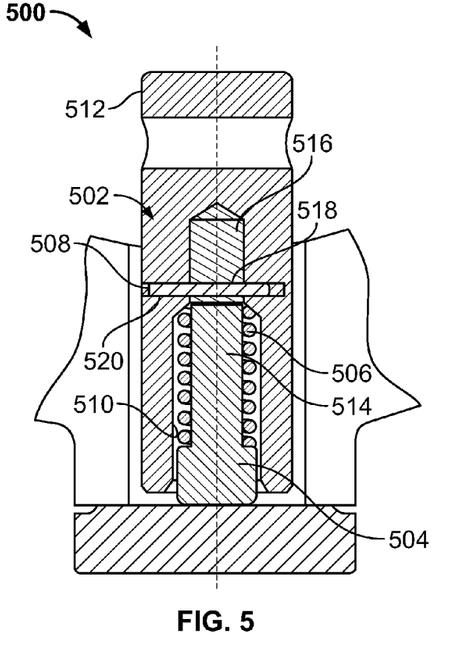

In FIG. 5, the example biasing apparatus 502 includes a spring seat 504, a spring 506, and a pin 508. At least a portion of the biasing apparatus 502 is disposed within a bore 510 of a follower shaft 512. The spring seat 504 includes a protruding member 514, at least a portion of which is a partial or segmented prong or leg 516. The protruding member 514 of the spring seat 504 and the shaft 512 include apertures 518 and 520, respectively, which coaxially align to receive the pin 508. The pin 508 couples the shaft 512 and the spring seat 504 to prevent the spring seat 504 and, thus, the spring 506 from twisting or rotating relative to the shaft 512 as the closure member (e.g., the closure member 108 of FIG. 1A) rotates between an open and closed position, thereby substantially eliminating or reducing torsional loading of the spring 506.

Figure 6:
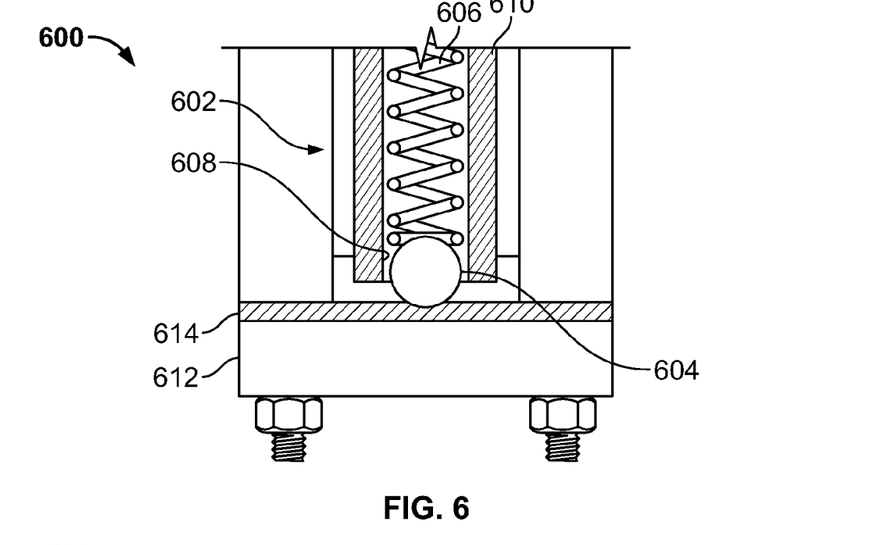

In FIG. 6, the example valve 600 includes the example biasing apparatus 602. In the illustrated example, the biasing apparatus 602 includes a ball bearing spring seat 604 and a spring 606 having at least a portion thereof disposed within a bore 608 of a shaft 610 (e.g., a follower shaft). The ball bearing spring seat 604 is captured between the spring 606 and an end cap 612. A gasket 614 (e.g., a graphite gasket) can be disposed between the end cap 612 and the ball bearing spring seat 604.

Figure 7:
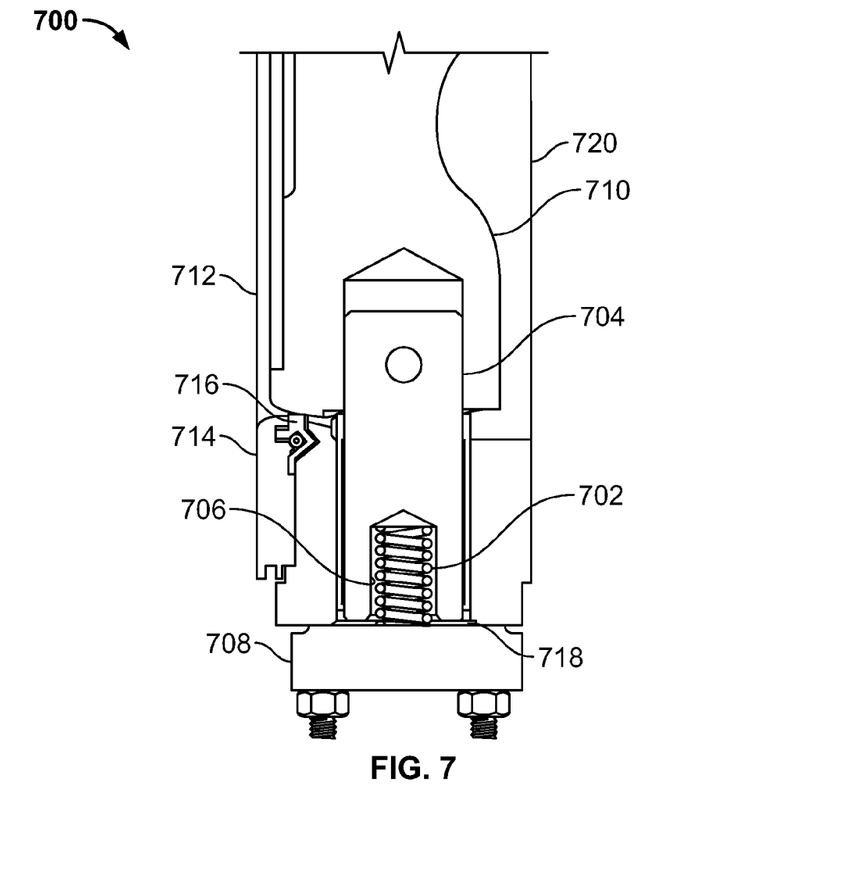

Referring to FIG. 7, the example valve 700 includes the example biasing apparatus 702. In the illustrated example, the biasing apparatus 702 is depicted as a coil spring. The valve 700 includes a follower shaft 704 having a bore 706 to receive at least a portion of the spring 702. An end cap 708 retains the spring 702 within the bore 706. The spring 702 opposes the weight of the valve components (e.g., the drivetrain 104 of FIG. 1B) to maintain alignment of a closure member 710, thereby preventing misalignment between the closure member 710 and a seal ring 712 that would cause undesired leakage. A retainer 714 retains a seal 716 against the seal ring 712 in which the seal 716 can be pressure-assisted to provide a tight shut-off (i.e., prevent leakage through the valve 700). A gasket 718 may be disposed between the end cap 708 and the spring 702 to provide a seal between a valve body 720 and the end cap 708.

Figure 8:
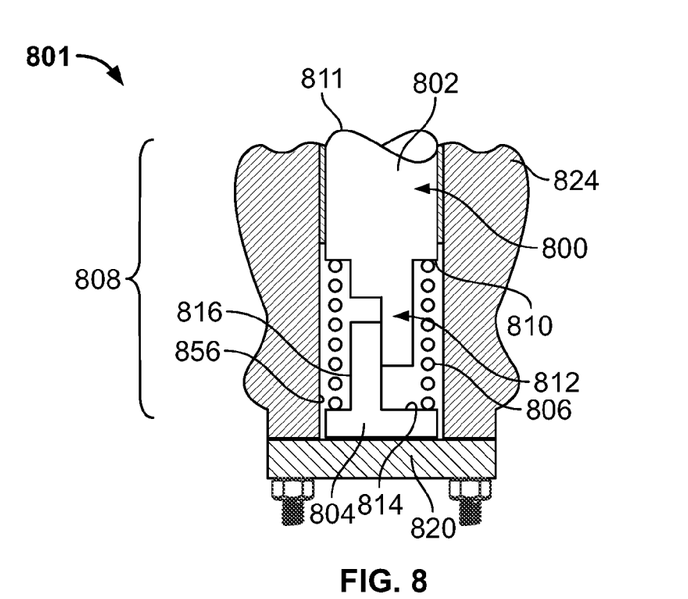

Referring to FIG. 8, the example valve 801 includes the example biasing apparatus 800. The example biasing apparatus 800 includes a first portion or spring seat 802, a second portion or spring seat 804, and a spring 806 (e.g., a coil spring, a helical spring, etc.) disposed therebetween. The first spring seat 802 and the second spring seat 804 form a body 808 that is sized so that at least a portion of the body 808 can be received by a bore 856 of a valve body 824. The first spring seat 802 includes a first seating surface 810 and a first protruding member 812 integral to a follower shaft 811 and the second spring seat 804 includes a second seating surface 814 and a second protruding member 816. As previously described, the second spring seat 804 and the spring 806 may be retained by an end cap 820. It should be appreciated that in the present example the integral spring seat 802 simplifies the biasing apparatus by reducing the number of parts therein.

Figure 9:
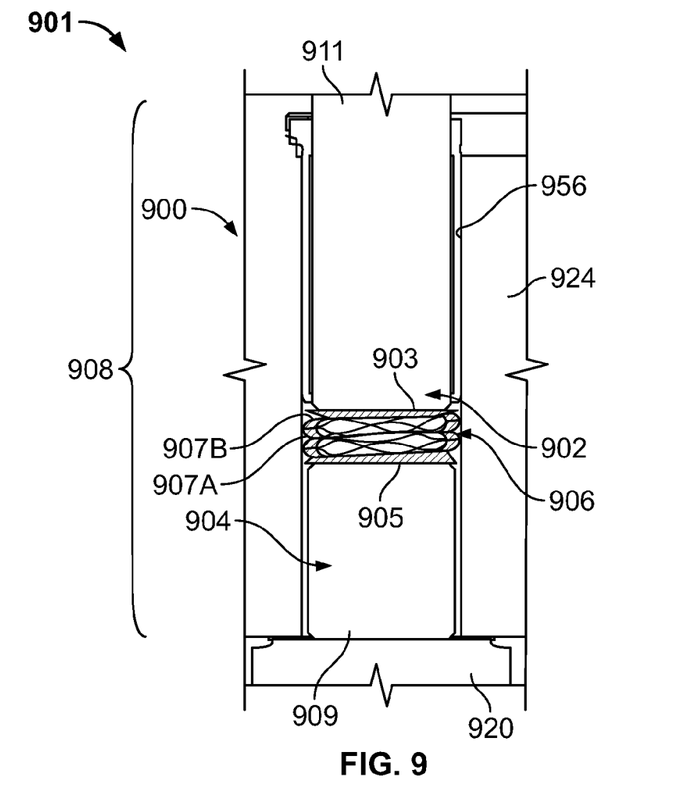

In FIG. 9, the example valve 901 includes the example biasing apparatus 900. The biasing apparatus 900 includes a first spring seat 902 formed on a distal end 903 of a follower shaft 911, a second spring seat 904 formed on an end 905 of a follower spacer 909, and a wave spring 906 disposed therebetween. The first spring seat 902 and the second spring seat 904 form a body 908 that is sized so that at least a portion of the body 908 can be received by a bore 956 of a valve body 924. As previously described, the second spring seat 904 and the wave spring 906 may be retained and the wave spring 906 may be compressed by an end cap 920. It should be appreciated that rotation of the follower shaft 911 is substantially prevented by operation of the wave spring 906. That is, the wave spring 906 is comprised of interleaved wave elements 907A and 907B. As the wave spring 906 is compressed, the interleaved wave elements 907A and 907B translate or slide past each other in a "scissor-like" fashion such that the end elements 907A and 907B of the wave spring 906 remain stationary with respect to each other.

Although certain apparatus, methods and articles of manufacture have been described herein, the scope of coverage of this patent is not limited thereto. To the contrary, this patent covers all apparatus, methods and articles of manufacture fairly falling within the scope of the appended claims either literally or under the doctrine of equivalents.

What is claimed is:

1. A valve comprising:
a valve body having an opening defining a passageway, the opening having an axis that is substantially coaxially aligned with a flow path axis defined by the passageway;
a shaft to support a closure member within the passageway of the valve body and relative to the opening, wherein the shaft includes a bore and an inner surface of the bore defines a first seating surface;
an end cap removably coupled to the valve body to retain the shaft within the valve body; and
a spring at least partially disposed within the bore of the shaft between the first seating surface and a second seating surface opposite the first seating surface, the spring to provide a force to oppose a weight of the closure member and facilitate alignment of the closure member relative to the opening, wherein the second seating surface comprises an annular surface having a leg protruding from the annular surface, the leg to receive at least a portion of the spring when the spring is disposed between the first and second seating surfaces.

2. A valve as defined in claim 1, wherein the shaft has a longitudinal axis non-parallel to the axis of the opening, and wherein the shaft defines the first seating surface.

3. A valve as defined in claim 1, wherein the spring comprises a coil spring.

4. A valve as defined in claim 1, further comprising a pin to engage an aperture of the leg and a slot of the shaft to rotatably fix the second seating surface relative to the first seating surface.

5. A valve as defined in claim 1, wherein the shaft is a follower shaft.

6. A valve as defined in claim 1, wherein the end cap covers an aperture of the valve body configured to receive the shaft.

7. A valve as defined in claim 1, further comprising a second shaft coupled to a flow control member, the shaft being spaced from the second shaft.

8. A valve as defined in claim 1, wherein the leg includes a first portion having a first diameter and a second portion having a second diameter different than the first diameter.

9. A valve as defined in claim 8, wherein the first diameter is less than the second diameter.

10. A valve as defined in claim 8, wherein the second portion of the leg defines a shoulder to provide the second seating surface.

11. A valve as defined in claim 10, wherein the first portion protrudes from the second portion, the spring to substantially surround the first portion when the leg is coupled to the shaft, the first portion to prevent the spring from shifting in a direction non-parallel relative to a longitudinal axis of the bore.

12. A valve as defined in claim 1, wherein the leg engages the end cap when the end cap is coupled to the valve body.

13. A valve as defined in claim 1, further comprising a pin to engage at least one of the leg or the shaft to rotatably fix the second seating surface relative to the first seating surface.

14. A valve comprising:
- a valve body having an opening defining a passageway, the opening having an axis that is substantially coaxially aligned with a flow path axis defined by the passageway;
- a shaft to support a closure member within the passageway of the valve body and relative to the opening, wherein the shaft includes a bore and an inner surface of the bore defines a first seating surface;
- an end cap removably coupled to the valve body to retain the shaft within the valve body; and
- a spring at least partially disposed within the bore of the shaft between the first seating surface and a second seating surface opposite the first seating surface, the spring to provide a force to oppose a weight of the closure member and facilitate alignment of the closure member relative to the opening, the second seating surface including a ball bearing disposed between the end cap and the spring.

15. A valve as defined in claim 14, wherein the ball bearing is at least partially disposed within the bore.

16. A valve comprising:
- a valve body having an opening defining a passageway, the opening having an axis that is substantially coaxially aligned with a flow path axis defined by the passageway;
- a first shaft to support a closure member within the passageway of the valve body and relative to the opening;
- an end cap removably coupled to the valve body to retain the first shaft within a bore of the valve body; and
- a spring disposed between a first seating surface and a second seating surface opposite the first seating surface to provide a force to oppose a weight of the closure member and facilitate alignment of the closure member relative to the opening, wherein the first seating surface is integrally formed with an end of the first shaft, wherein the first seating surface includes a first protruding leg that is to slidably engage a second protruding leg extending from the second seating surface, wherein the second seating surface is disposed between the end cap and the first shaft.

* * * * *